United States Patent [19]

Quick

[11] 4,398,432
[45] Aug. 16, 1983

[54] TRANSMISSION WITH OVERRUNNING CLUTCHES

[75] Inventor: David C. Quick, New Berlin, Wis.

[73] Assignee: Allis-Chalmers Corporation, Milwaukee, Wis.

[21] Appl. No.: 219,264

[22] Filed: Dec. 22, 1980

[51] Int. Cl.³ .............................................. F16H 3/08
[52] U.S. Cl. ....................................... 74/331; 74/329; 74/333; 74/357; 74/360
[58] Field of Search ................. 74/329, 331, 332, 333, 74/357, 358, 359, 360

[56] References Cited

U.S. PATENT DOCUMENTS

| | | | |
|---|---|---|---|
| 3,362,245 | 1/1968 | Francuch et al. | 74/359 |
| 3,400,601 | 9/1968 | Ruhl et al. | 74/360 |
| 3,498,150 | 3/1970 | Funk | 74/331 |
| 3,498,151 | 3/1970 | King | 74/359 |
| 3,600,963 | 8/1971 | Portmann | 74/359 |
| 3,799,002 | 3/1974 | Richards | 74/331 |
| 3,906,817 | 9/1975 | Kreitzberg | 74/331 |
| 4,033,200 | 7/1977 | Stockton | 74/359 |
| 4,065,981 | 1/1978 | Whateley et al. | 74/331 |
| 4,116,082 | 9/1978 | Kelbel | 74/360 |
| 4,311,062 | 1/1982 | Hamada et al. | 74/360 |

Primary Examiner—Leslie A. Braun
Assistant Examiner—Joseph M. Rolnicki
Attorney, Agent, or Firm—Arthur L. Nelson

[57] ABSTRACT

A vehicle transmission having power shift means and an overrunning clutch to selectively provide a multiple speed transmission with shifting of the vehicle transmission while the vehicle is operating. The transmission includes a main drive shaft, a jackshaft and a countershaft with a selective manual gear shift on the countershaft. The main drive is through the countershaft and a plurality of gearsets having clutching means to manually select one of a plurality of speed ratios. The first input speed drives through the first overrunning clutch to the main drive shaft. The jackshaft is selectively engaged through a power shift clutch to provide a second input speed to the main drive shaft. When the jackshaft is in operation, the first overrunning clutch is disengaged and the drive is through the power shift clutch to rotate the main drive shaft at the higher speed. This provides two input speeds to the main drive shaft which are controlled by the operator by selectively engaging or disengaging of the power shift clutch. The second overrunning clutch is connected between the input shaft and the jackshaft and normally is disengaged when the jackshaft is in operation. The second overrunning clutch, however, provides the advantage of having a means for braking the vehicle through the engine when the vehicle is coasting and power shift clutch is disengaged, since the second overrunning clutch is then engaged and counterrotates to provide the braking means.

10 Claims, 6 Drawing Figures

TRANSMISSION WITH OVERRUNNING CLUTCHES

This invention relates to a vehicle transmission and more particularly to a multiple speed transmission having power shifting and overrunning clutch means to provide shifting "on the go."

The conventional manual shifting of the tractors while they are standing still has been used over the years. While this is generally quite satisfactory, the terrain on which the tractors operate varies considerably, and the draft load applied to the tractor varies equally as much. Accordingly, there is a need to upshift or downshift the speed of the tractor, in accordance with variations in the terrain particularly in earth working operations. Accordingly, the power shift transmission overcomes this need in a transmission for a tractor. The power shift transmission having a friction type clutch where hydraulic pressure in the hydraulic actuator engages the friction discs and allows a limited amount of slip to engage or disengage the transmission. The power shift transmission has advantages over the conventional manual shift particularly in that it can be shifted "on the go." It is not necessary that a power shift clutch be used in all speeds of the transmission. A manual shift is adequate for use in some speeds with a power shift clutch to upshift and downshift the speed of the transmission in each of the speed ranges. To increase the number of speed ranges, a range transmission may be positioned at the rear of the transmission to multiply the overall transmission speeds driving the rear drive assembly. The range transmission is often a manually shifted transmission to provide an increased number of transmission speeds and will accommodate the operator by providing a greater number of speed ranges and adapt a tractor for use to just about any kind of soil condition or crop condition as is required.

The U.S. Pat. No. 3,906,817, Kreitzberg, is a typical illustration of a tractor transmission with a two-speed power shift transmission at the front of a manually shifted transmission and a range transmission to multiply the output from the transmission to provide the operator of the tractor with broad range of speed ratios for the transmission. While this transmission provides a broad range of speed ratios for the tractor, the applicant's invention has provided a broad range of speeds, but eliminated one power shift clutch. This is accomplished by the use of two overrunning clutches in which the first overrunning clutch drives the main drive shaft at a predetermined speed ratio. By shifting through a power shift clutch, a jackshaft is provided in which the speed of the main drive shaft can be increased to provide a second speed ratio. As the speed of the main drive shaft is increased, the overrunning clutch will slip and allow the transmission to operate at a higher speed ratio. Accordingly, the advantage of two power shift clutches at the front of the transmission and the range transmission at the rear may be incorporated in this transmission.

Accordingly, it is an object of this invention to provide a power shift transmission with overrunning clutches to provide a multiple speed tractor transmission.

It is another object of this invention to provide a multiple speed countershaft transmission with power shift and overrunning clutches to provide shifting of the transmission while the vehicle is in operation.

It is a further object of this invention to provide a multiple speed transmission with power shift and overrunning clutches operating through countershafts. The direct drive of the main drive shaft is driven through an overrunning clutch while the second speed is driven through a countershaft and the power shift clutch to selectively provide high and low speeds for the transmission to shift while in operation. A two speed range shift is also provided to multiply the output of the transmission and increase the overall gear ratios of the transmission.

The objects of this invention are accomplished by a transmission having a main drive shaft, a jackshaft and a countershaft with a selective manual gear shift on the countershaft. A range transmission is also connected to the output of the multiple speed transmission to provide a high/low speed range for the transmission by multiplying the output of the main transmission. The main drive is through the countershaft and a plurality of gearsets having clutching means to manually select one of a plurality of speed ratios. The first input speed drives through the first overrunning clutch to the main drive shaft and through the main transmission. The jackshaft is selectively engaged through a power shift clutch to provide a second input speed to the main drive shaft. When the jackshaft is in operation, the first overrunning clutch is disengaged and the drive is through the power shift clutch to rotate the main drive shaft at the higher speed. This provides two input speeds to the main drive shaft which are controlled by the operator by selectively engaging or disengaging of the power shift clutch. The second overrunning clutch is connected between the input shaft and the jackshaft and normally is disengaged when the jackshaft is in operation. The second overrunning clutch, however, provides the advantage of having a means for braking the vehicle through the engine when the power shift clutch is disengaged, since the second overrunning clutch is then engaged and counterrotates to provide the braking means.

Accordingly, the transmission provides multiple forward speeds and multiple reverse speeds which can be selectively engaged through the manual shifting of the main transmission and the range transmission. The shifting of the power shift clutch selectively engages or disengages two speed operation to the transmission for shifting "on the go" for upshifting, downshifting of the transmission.

Referring to the drawings, the preferred embodiments of this invention are illustrated.

Figure 1:
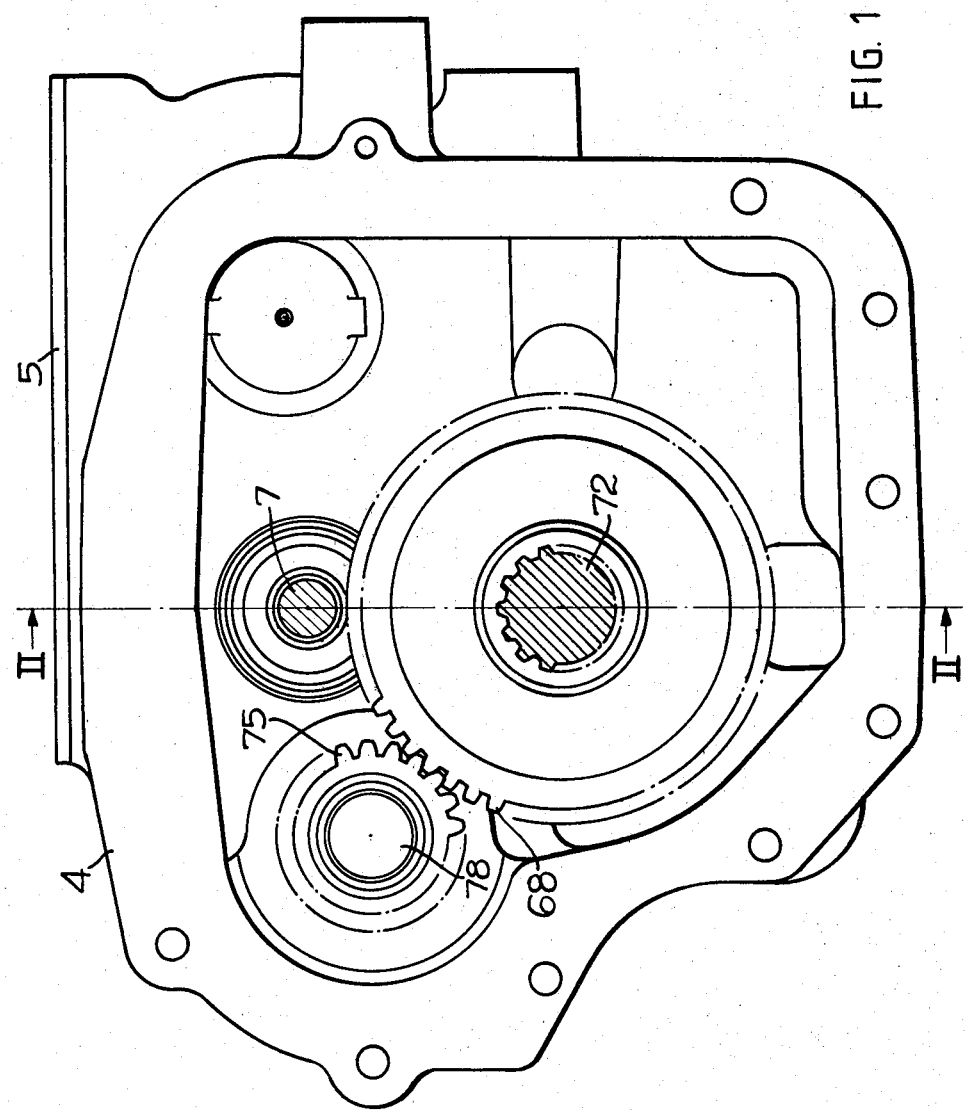
FIG. 1 illustrates an end view of the transmission.

Referring to the drawing, the preferred embodiment of this invention is illustrated.

Figure 2:
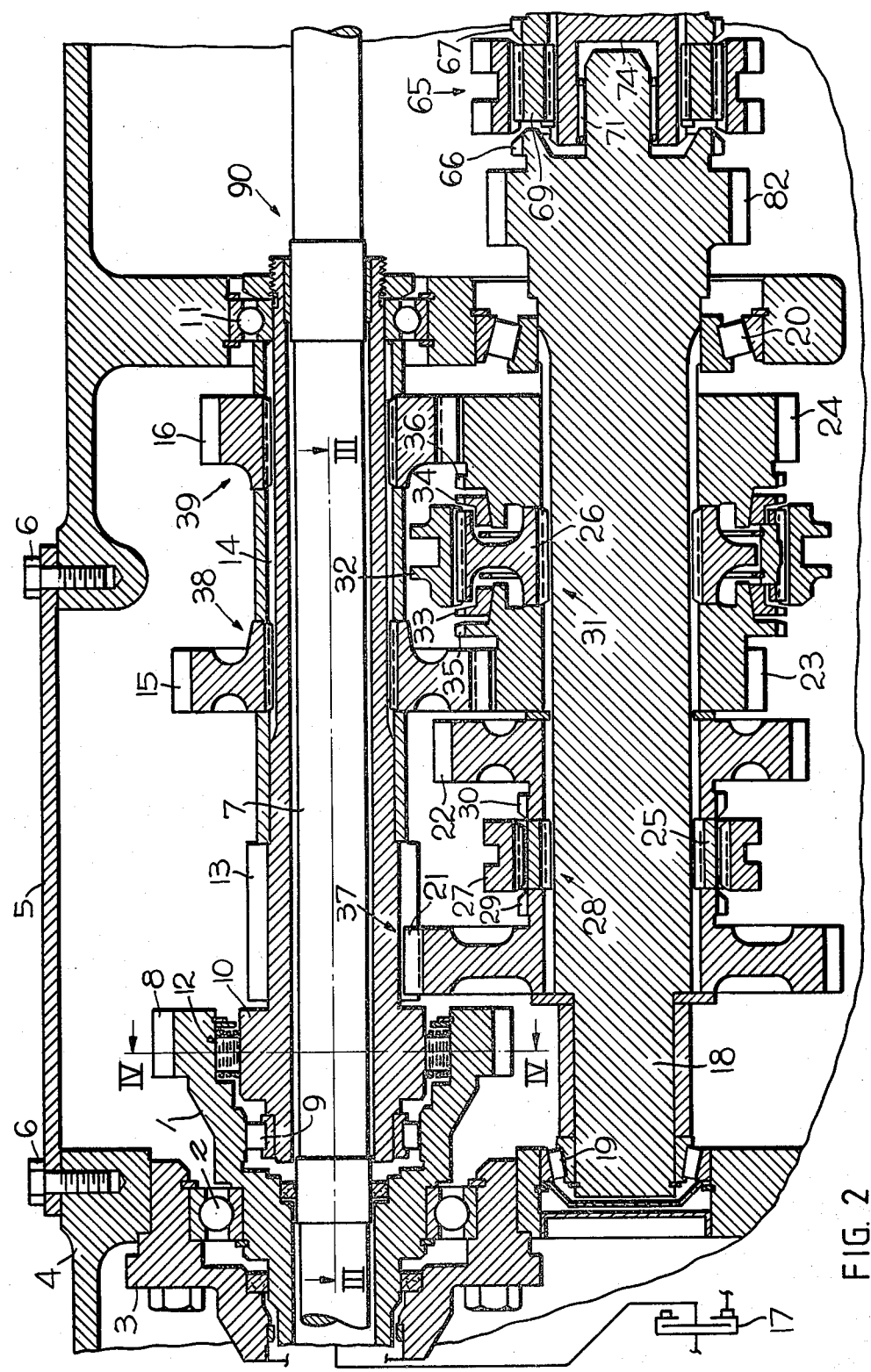
FIG. 2 is a cross-section view taken on line II—II of FIG. 1 of the main transmission showing the main drive shaft and the countershaft.

Referring to FIG. 1, the end view of the transmission and the output of the transmission are shown. FIG. 2 shows the input shaft 1 rotatably supported in the bearing 2 and braced by the bearing support 3 mounted in the transmission housing 4. The coverplate 5 is bolted by means of a plurality of bolts 6 on the top of the transmission.

The power takeoff shaft 7 is rotatably mounted within the input shaft 1 which is a hollow structure. The input shaft 1 is integral with the drive gear 8 which drives the transmission.

The roller bearing assembly 9 rotatably mounted within the gear structure 8 rotatably supports the main drive shaft 10 which is also a quill shaft. The main drive shaft 10, is rotatably supported in the bearing assembly 11 in the housing 4.

The drive shaft 10 is driven by the overrunning clutch 12 between the gear 8 of input shaft 1 and the drive shaft 10. The drive gear 13 is integral with the drive shaft 10. The drive shaft 10 also is formed with a spline 14 which engages mating splines on the gears 15 and 16.

Input shaft 1 is connected to an engine clutch 17 which selectively drives the input shaft when the clutch is engaged.

The countershaft 18 is rotatably mounted in the bearing assemblies 19 and 20 supported in the transmission housing. The driven gears 21, 22, 23 and 24 are rotatably mounted on the countershaft 18. The countershaft 18 is formed with a spline which mates the spline on the internal periphery of the clutch collar 25 as well as the spline on clutch collar 26. A clutch sleeve 27 in the clutch assembly 28 engages external clutches on clutch collar 25 and selectively engages clutch teeth 29 on gear 21 as well as the clutch teeth 30 on gear 22. Clutch 28 is selectively engaged by selective reciprocation of the clutch sleeve 27.

Clutch 31 is a synchronized clutch and includes the clutch sleeve 32 which effectively engages synchronizer sleeves 33 and 34 prior to engagement with the clutch teeth 35 of the gear 23 and the clutch teeth 36 of gear 24. Both clutches 28 and 31 are manually operated by suitable clutch forks, and engaging mechanism not shown.

The clutch 27 selectively engages the gearset 37 including gears 13 and 21, as well as the reverse gear 22 which will be subsequently described. The clutch 31 selectively engages the gearset 38 including gear 15 and gear 23 and selectively engages the gearset 39 including gears 16 and 24.

Figure 3:
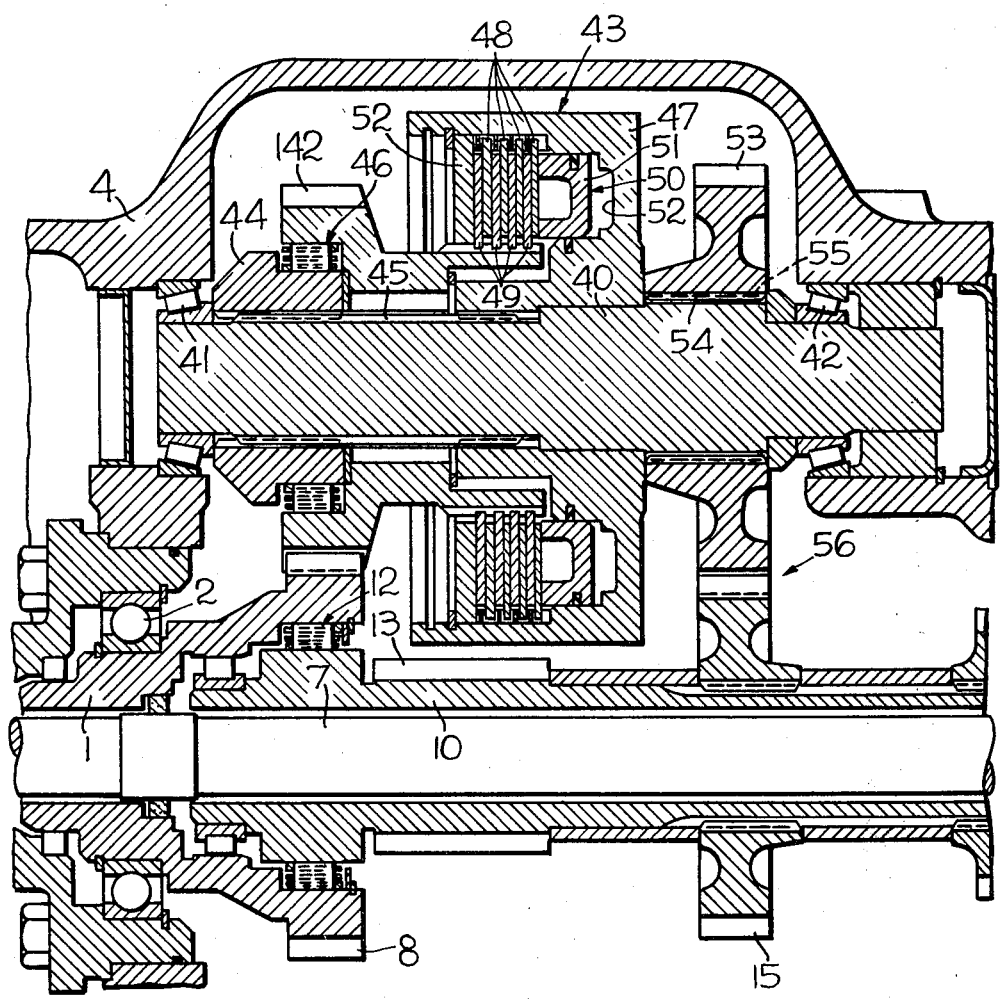
FIG. 3 is a cross-section view taken on line III—III of FIG. 2 showing a portion of the main drive shaft and the jackshaft and power shift clutch.

Referring to FIG. 3, a jackshaft 40 is rotatably mounted in the bearing assemblies 41 and 42 mounted in the transmission housing 4. The input gear 8 and input shaft 1 drive the hub gear 142 which forms the hub for the power shift clutch 43. While the hub gear 142 is rotatably mounted on the jackshaft 40, the sleeve 44 is connected to the spline 45 formed on the jackshaft 40. Intermediate the clutch sleeve 44 and the gear hub 142 is positioned an overrunning clutch 46. The overrunning clutch 46 overruns from the drive of the input gear 8 to the hub gear 142 of the power shift clutch 43. For counterdrive, the overrunning clutch 46 engages and locks the clutch hub 44 to the hub gear 142.

A clutch drum 47 is also connected by a spline to the spline 45 on the jackshaft 40. The clutch drum 47 carries clutch discs 48 which selectively engage the clutch discs 49 on the clutch hub 142. A hydraulic actuator 50 includes the piston 51 and the cylinder 52 for engaging the power shift clutch 43. The reaction plate 52 is mounted within the clutch hub 47 to receive the reaction force when the clutch is engaged.

The gear 53 is connected through a spline 54 to the mating spline 55 on the jackshaft 40. The gear 53 forms a gearset 56 with the gear 15. The gear 15 is connected through the spline on the main drive shaft 10 to provide a drive from the power shift clutch to the main drive shaft 10. Reverse drive, when the engine is braking the vehicle, is transmitted through the gearset 56 to the jackshaft 40 and the clutch sleeve 44. Clutch sleeve 44 transmits the counterforce through overrunning clutch 46 to the hub gear 142 back to the input gear 8 and input shaft 1.

Figure 4:
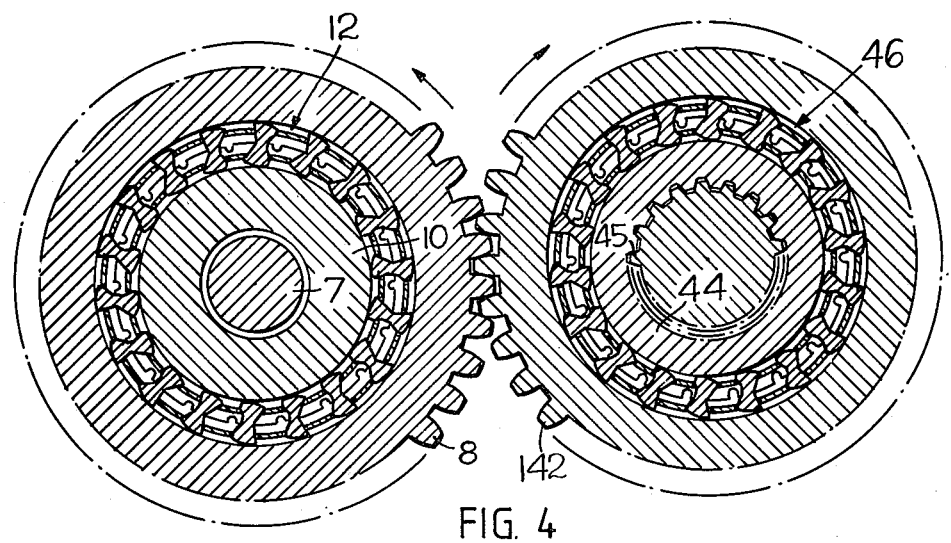
FIG. 4 is a cross-section view taken on line IV—IV of FIG. 2.

FIG. 4 illustrates the overrunning clutches 12 and 46. The overrunning clutch 12 drives the main shaft 10 while the gear 8 drives the hub gear 142. As the transmission is operating in the forward direction through the overrunning clutch 12, the overrunning clutch 46 is slipping.

When the transmission is braking through the engine, the overrunning clutch 46 is transmitting a reverse force to the hub gear 142 and the input gear 8. The overrunning clutch 12 is slipping under these conditions.

Figure 5:
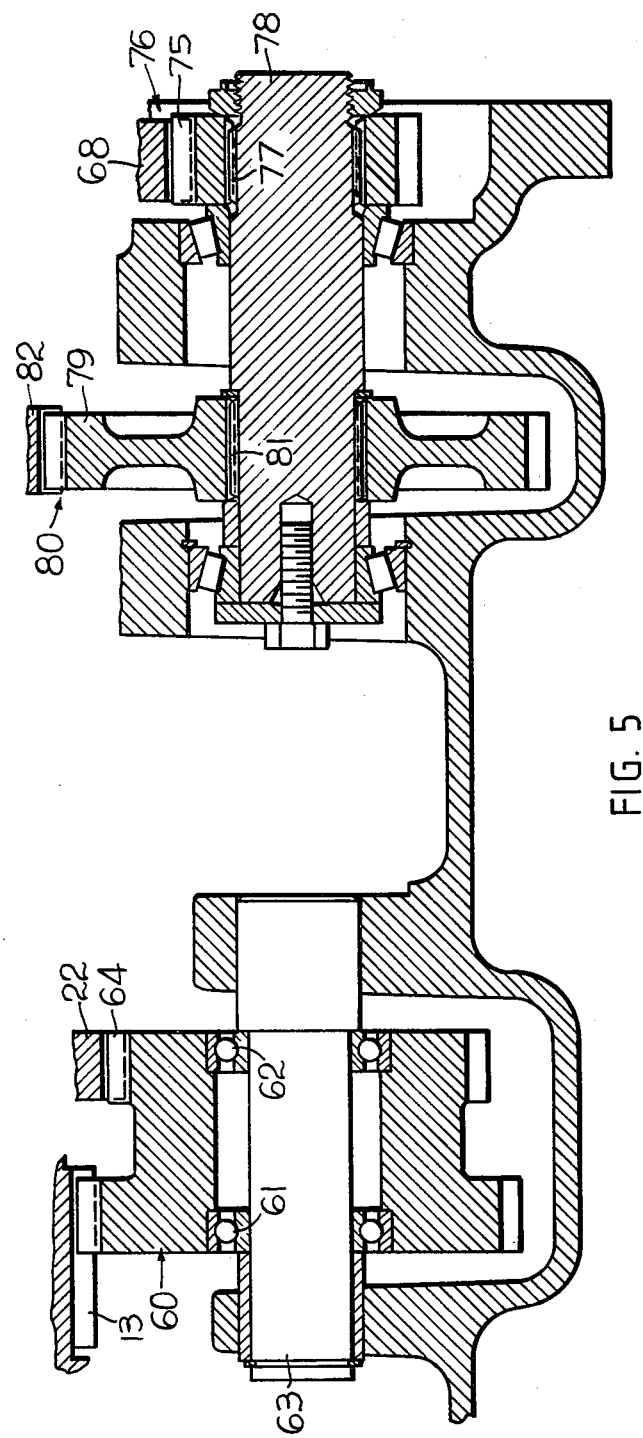
FIG. 5 is a cross-section view showing the cluster gear for the reverse drive and part of the range transmission.

Referring to FIG. 5, the reverse gear is shown. The gear 13 drives cluster gear 60 which is rotatably mounted on the bearing assemblies 61, 62 of the stubshaft 63. The cluster gear 60 includes a gear 64 which meshes with the gear 22. The stubshaft provides a counterrotation for the drive from the main drive shaft 10 to the countershaft 18.

Figure 6:
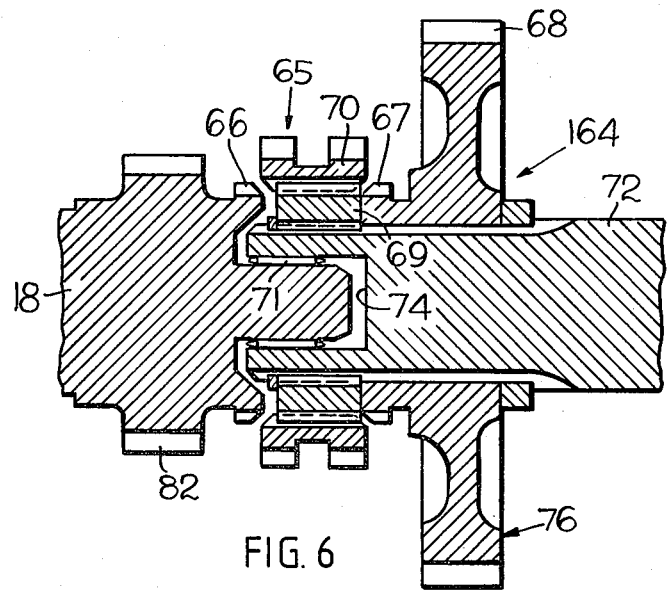
FIG. 6 is a cross-section view showing the range transmission shift and the output shaft of the main transmission and the range transmission.

FIG. 6 illustrates the range transmission 164. The range transmission includes a clutch 65 for selectively engaging gear teeth 66 on the end of the countershaft 18. The clutch 65 can be shifted in the other direction to engage clutch teeth 67 on the gear 68.

The clutch 65 includes a clutch collar 69 and clutch sleeve 70. The countershaft 18 is provided with a roller bearing 71 to rotate on the inner periphery of the output shaft 72. The output shaft 72 is formed with an opening 74 on its mating end.

When the gear 68 is engaged by the clutch 65, the gear 68 drives through the gear 75 of the gearset 76. The gear 75 is connected through a spline on the gear to the spline 77 on the stubshaft 78. The gear 79 of gearset 80 is also connected through a spline to the spline 81 on the stubshaft 78. The gear 79 of gearset 80 is in constant meshing engagement with the gear 82 on the end of the countershaft 18.

The range transmission 164 provides two speed operation from the output of the main transmission 90. Two speed operation is manually shifted by shifting the clutch 65 to the selected speed ratio. The range transmission multiplies the output from the main transmission to double the speed ratios of the overall transmission.

The operation of the device will be described in the following paragraphs.

The input shaft 1 is integral with the drive gear 8 which drives the main drive shaft 10 through the overrunning clutch 12 during normal operation. The main drive shaft 10 is integral with the gear 13 and connected through splines to gears 15 and 16. During normal operation the clutches 28 and 31 are manually operated. Clutch 28 selectively operates the first speed range through the gearset 37 and the reverse speed range through the gearset 60 including gear 22. The gear 13 drives the reverse cluster gear 60 and the clutch 28 shifts to the reverse position.

The synchronized clutch 31 selectively engages the gearset 38 which is the third speed gear ratio. The clutch 31 can also be shifted to engage the gearset 39 which is the second speed and gear ratio. The manual shifting of the main transmission is done while the vehicle is stationary and the transmission is not in operation. The range transmission is also a manual shifting operation in which the clutch 65 is selectively positioned to engage gear 82 to drive directly to the output shaft 72 or drive through the range transmission including gearset 80. Manually shifting of these gear ratios is done while the vehicle is stationary and the transmission is not in operation.

Low drive in the low speed range through the overrunning clutch 12 is accomplished when the power shift clutch 43 is disengaged.

When the power shift clutch 43 is engaged the input gear 8 drives the clutch hub gear 142 and drives through the power shift clutch 43 to the clutch drum 47. The clutch drum 47 is connected to the jackshaft 40. The gearset 56 including gear 53 is connected to the jackshaft and drives through the main shaft 10 to provide a higher speed ratio. The main shaft 10 being driven at a higher speed ratio than when driven through the overrunning clutch 12 causes the overrunning clutch 12 to disengage and slip while the power shift clutch is in operation. When the power shift clutch 43 is disengaged, the drive automatically goes through the overrunning clutch 12 and the transmission is shifted into the lower gear ratio.

The embodiments of the invention in which an exclusive property or privilege is claimed are defined as follows:

1. A vehicle transmission comprising; an input shaft, a drive shaft, an overrunning clutch connected between said input shaft and said drive shaft and driving said drive shaft, a countershaft, a plurality of gearsets drivingly connecting said drive shaft with said countershaft, a manual clutching means selectively and alternatively clutching selected ones of said gearsets for driving said countershaft, a jackshaft, at least one gearset drivingly connected between said jackshaft and said drive shaft, a friction clutching means on said jackshaft for engaging drive through said jackshaft to said drive shaft causing said overrunning clutch to overrun, a second overrunning clutch drivingly connected between said input shaft and said jackshaft and normally overrunning, said second overrunning clutch engaging for a counterdrive from said countershaft through said jackshaft and input shaft for providing engine braking of said vehicle when the vehicle is coasting, said friction clutching means and said overrunning clutches thereby providing shifting during operation of said transmission.

2. A vehicle transmission as set forth in claim 1 including, a range transmission drivingly connected to be driven by said transmission for providing a multiple of the transmission speed ratios.

3. A vehicle transmission as set forth in claim 1, wherein said transmission includes a reverse drive.

4. A vehicle transmission as set forth in claim 1 wherein said friction clutching means defines a power shift clutch.

5. A vehicle transmission as set forth in claim 1 wherein said friction clutching means includes a hydraulic actuator, friction clutch disks for engaging and actuation of said friction clutching means.

6. A vehicle transmission as set forth in claim 1 including a synchronizing manually operated clutch in said transmission.

7. A vehicle transmission as set forth in claim 1 wherein said manually operated clutches include a clutch collar and a clutch sleeve with clutch engaging teeth mounted on one of said shafts for manually shifting said transmission.

8. The transmission as set forth in claim 1, wherein said transmission provides a twelve forward speed transmission.

9. A vehicle transmission as set forth in claim 1 wherein said power shift clutch and said overrunning clutches provide two power shift speeds.

10. A vehicle transmission as set forth in claim 1 including an overrunning clutch providing a low speed and a power shift clutch for providing a high speed gear.

* * * * *